United States Patent [19]

Takamatsu et al.

[11] Patent Number: 4,474,432

[45] Date of Patent: Oct. 2, 1984

[54] OPTICAL DISPLAY PANEL STRUCTURE

[75] Inventors: Toshiaki Takamatsu, Tenri; Fumiaki Funada, Yamatokoriyama; Hiroshi Uede, Wakayama; Tomio Wada, Nara, all of Japan

[73] Assignee: Sharp Kabushiki Kaisha, Osaka, Japan

[21] Appl. No.: 235,632

[22] Filed: Feb. 18, 1981

[30] Foreign Application Priority Data

Feb. 18, 1980 [JP] Japan .................................. 55-19538

[51] Int. Cl.³ .............................................. G02F 1/13
[52] U.S. Cl. .................. 350/339 R; 350/333; 350/336; 350/332
[58] Field of Search .................... 350/331 R, 332, 334, 350/336, 339 R, 333

[56] References Cited

U.S. PATENT DOCUMENTS

| 3,718,842 | 2/1973 | Abbott et al. | 350/334 |
| 4,145,120 | 3/1979 | Kubota | 350/334 X |
| 4,295,711 | 10/1981 | Tanaka et al. | 350/334 |
| 4,295,712 | 10/1981 | Ishiwatari | 350/344 |

Primary Examiner—John K. Corbin
Assistant Examiner—Richard Gallivan
Attorney, Agent, or Firm—Birch, Stewart, Kolasch & Birch

[57] ABSTRACT

A liquid crystal display cell includes two opposing substrates at least one of which is made of a highly polymerized transparent compound film. The transparent film is extended from the liquid crystal display cell. Wiring patterns are formed on the thus extended portion of the transparent film. Semiconductor circuit elements for driving the liquid crystal display cell are mounted on the extended portion of the transparent film and electrically connected to the wiring patterns.

4 Claims, 4 Drawing Figures

OPTICAL DISPLAY PANEL STRUCTURE

BACKGROUND OF THE INVENTION

The present invention relates generally to an optical device and, more particularly, to a structure for an optical display panel such as a liquid crystal display panel.

Recently, an optical display panel such as a liquid crystal display panel, has been proposed with an improved terminal connection structure. See, for example, copending U.S. patent application, Ser. No. 188,562, filed on Sept. 18, 1980 by F. Funada et al. entitled "ELECTRODE TERMINAL ASSEMBLY ON A MULTI-LAYER TYPE LIQUID CRYSTAL PANEL".

A United Kingdom counterpart was filed, also on Sept. 18, 1980, as patent application No. 8030273 and a West German counterpart was filed on the same day as Patent Application No. P 30 35 268.2. The disclosure of each of these patent applications is incorporated herein by reference.

A purpose of recent development efforts as shown by each of these patent applications is to provide an electrode lead scheme that is easy to manufacture and handle, the scheme including a very large number of terminals for connecting an optical cell such as a liquid crystal display device, to a power source.

However, the prior art electrode lead structures inclusive of each of the above-identified patent applications could not provide excellence with respect to, for example, the small mass or thinness of the optical cell.

SUMMARY OF THE INVENTION

Accordingly, it is an object of the present invention to provide an improved optical display panel such as a liquid crystal display.

It is another object of the present invention to provide such an improved optical display panel with a very large number of terminals, the panel being very compact and very thin.

Other objects, advantages, features and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following detailed description.

To achieve the above objects, pursuant to a preferred embodiment of the present invention, at least one substrate of a liquid crystal display panel is made of a transparent highly polymerized compound film. The transparent highly polymerized compound film is extended from the panel section to support the semiconductor circuit elements. Electrodes for the liquid crystal display panel are formed on the transparent highly polymerized compound film in the panel section and electrically connected to the semiconductor circuit elements via wiring patterns formed directly on the transparent highly polymerized compound film.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
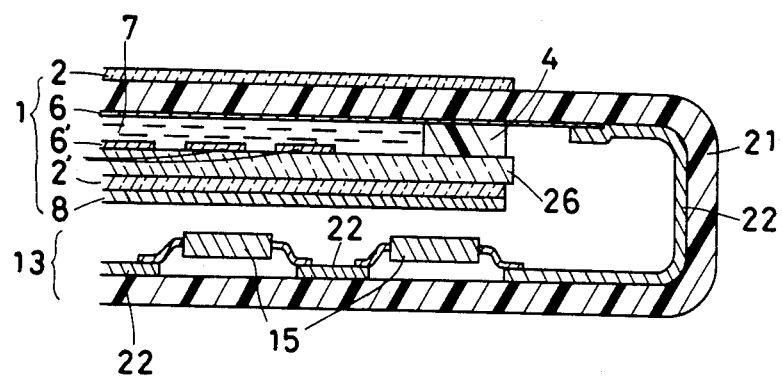
FIG. 1 shows a cross sectional view of an optical display panel, such as a liquid crystal display panel, according to the present invention.

Now with specific reference to FIG. 1, an optical display panel embodying the present invention includes a film 21 composed of a highly polymerized compound such as a polyethyleneterephthalate film, for example, "DIAFOIL" manufactured by Mitsubishi Plastic Industries Ltd., a polycarbonate film manufactured by, for example, Toray Industries Company, a polyvinyllidenefluoride film manufactured by, for example, Asahi Glass Co., Ltd., and a tetrafluoroethylene hexafluoropropylene copolymer film manufactured by, for example, Asahi Glass Co., Ltd. Each of these compounds is transparent, flexible with an appropriate degree of rigidity, and thermally stable. The film 21 supports an optical display panel such as a matrix type liquid crystal display panel, and a driver circuit therefor.

Figure 2:
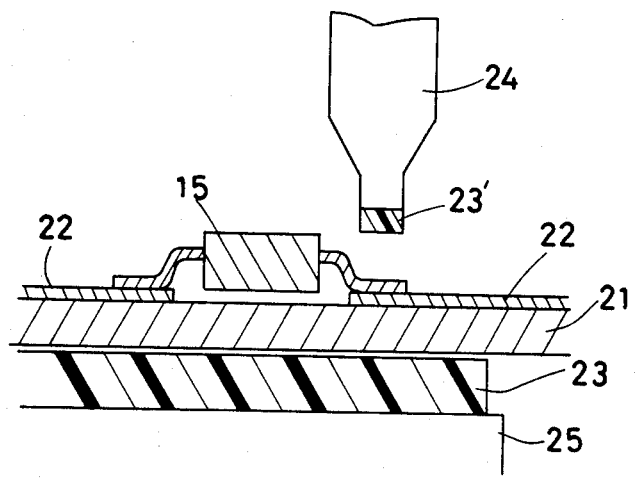
FIG. 2 shows a cross sectional view taken during a step of a manufacturing process used for producing the panel assembly of FIG. 1.

FIG. 2 shows a step of a manufacturing process employed to complete the display assembly as shown in FIG. 1, wherein a semiconductor circuit element is coupled or adhered to a conductive coating by thermal bonding.

Returning to FIG. 1 with greater particularity, the film 21 composed of a highly polymerized transparent compound is provided as a substrate for a control circuit unit 13 and for a liquid crystal display panel 1. The film 21 supports a plurality of transparent electrodes 6 functioning as the column electrodes of the liquid crystal display panel 1 manufactured by a process whereby conductive and patterned electrodes made of, e.g., $In_2O_3$ are formed. The conventional orientation procedures such as rubbing or slant evaporation are applied thereon after an insulating film, such as $SiO_2$, is formed.

A wiring pattern 22 is provided for connecting the transparent electrodes 6 to a driver circuit comprising one or more active or passive elements such as an IC. A suitable conductive coating composition is deposited on the film 21 by screen printing or the like. The thus deposited coating film is dried to form the pattern 22. Preferred examples of the conductive coating composition are made by mixtures of the following substances:

1. Metallic or non-metallic conductive materials:
   Powdered Ag, Au, or C
2. Fixer:
   Chloroprene-rubber;
   Chlorosulfonate-rubber;
   Polyurethane; or
   Vinyl acetate ethylene copolymer
3. Binder:
   Dimethylformamide;
   Dimethylacetamide;
   Diethyl carbitol;
   Butyl carbitol;
   Carbitol;

Turpentine oil;
Pine oil;
Ethylene glycol;
Glycerol;
Butyl acetate;
Cellosolve; or
Cellosolve acetate Usually, the powdered carbon particles are used. To provide a low resistivity for the electrode, a first layer can be printed containing powdered silver particles and a second layer can be printed thereover containing the powdered carbon particles.

A conventional transparent counter substrate 26, formed from conventional transparent material carries patterned electrodes 6', as row electrodes, which have insulating films thereon through the application of liquid crystal orientation techniques. On the other surface of the substrate 26, a polarizer 2' and a reflection plate 8 are disposed. Then, the substrate 26, as a counter substrate, is positioned opposite to the film 21 with an appropriate distance therebetween to provide a cavity closed laterally by a sealing element 4. The element 4 is disposed around the periphery of the cavity to define the liquid crystal display cell.

Another polarizer 2 is disposed on the film 21 at the other side from the substrate 26. Liquid crystal material 7 is injected within the cavity between the film 21 and the substrate 26. Thus, a liquid crystal display panel 1 of the matrix electrode type is formed comprising the film 21, the substrate 26, the transparent electrodes 6 and 6', the polarizers 2 and 2', the sealing element 4, the reflection plate 8, and the liquid crystal mixture 7.

To provide an accurate separation between the film 21 and the substrate 26, powdered glass fiber particles may be dispersed within the display area of the cavity; however they must be removed before the liquid crystal mixture 7 is injected by vacuum injection. If it is possible that the liquid crystal molecular orientation treated layer may be removed or damaged mechanically while printing the wiring pattern 22, it may be necessary to coat the orientation treated layer with a film of "SILI-TECT", manufactured by Controlyne Inc., or to dispose an appropriate film on the display area of the display 1. These protective films should be removed after printing the wiring pattern 22.

Instead of the above manufacturing process, another process may be applied, e.g., one comprising steps of making the liquid crystal display panel assembly 1 by patterning the electrodes, evaporating the insulating layers, and treating the liquid crystal molecule orientation process, and the final step of printing the wiring pattern.

An IC 15 inclusive of passive and active circuit elements forming a driver circuit is connected to the wiring pattern 22 formed on the film 21 by the following steps, with reference to FIG. 2. A cushioned material 23 such as a rubber plate is disposed on a supporting table 25. The film 21 is disposed on the cushioned material 23. On the film 21, the wiring pattern 22 is disposed on which the IC 15 is arranged appropriately. A thermal head 24 having a cushioned material 23' such as a rubber at its tip, presses, with an appropriate temperature such as about 150° to 180° Centigrade, leads coupled to the IC 15 against the wiring pattern 22. Electrical connection between the leads and the wiring pattern 22 is facilitated with the help of resin within the wiring pattern, which is readily adhered to the pattern 22. Thus, the driver circuit 13 is completed.

This arrangement is featured in that the film 21 functions as a transparent substrate for the column electrodes 6 of the liquid crystal display panel 1 and that, because of the flexibility of the film 21, the display panel 1 and the driver circuit unit 13 may be opposed to each other by a U-shaped folding of the film 21. The total mass of this display assembly is made thin and compact. The wiring pattern 22 is thus composed of conductive coating film.

Figure 3:
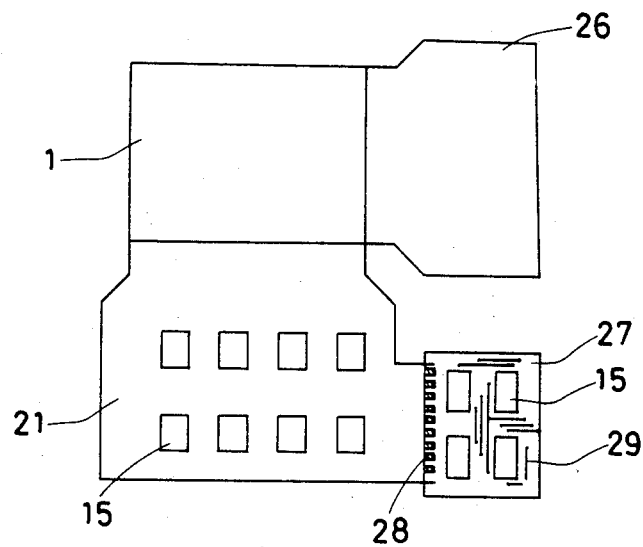
FIG. 3 shows a plan view of another type of optical display panel according to the present invention.

FIG. 3 shows another preferred example of a liquid crystal display panel in plan view. In this example, a circuit substrate 27 such as a ceramic plate or the like is adhered to the film 21. One or more IC's 15 are disposed on the film 21 for providing column signals to the matrix type liquid crystal display 1. Connection terminals 28 between the circuit substrate 27 and wirings disposed on the film 21, the wirings being coupled to the IC's 15 as previously described, are provided which are bonded together by the above-mentioned thermal bonding with pressure. An insulating coating can be printed on the film 21. In case where another circuit substrate is connected to the circuit elements on the film 21 as, shown in FIG. 3, to print the insulating coating in addition to the above stated conductive coating makes their connection stronger and easier than to print only the conductive coating because of the cooperation by the conductive and the insulating coatings. As shown in FIG. 3, counter substrate 26 corresponding to the like-numbered element in FIG. 1 extends from the portion of film 21 which forms the first substrate of display 1. In forming the finished device, portion 26 is positioned opposite display area 1 of film 21, as shown in FIG. 1.

In this example, the conductive coating preferably includes a thermoplastic resin such as chloroprene-rubber and phenol resin, aluminum powder, and a binder made of toluene ethyl acetate.

A multi-layer wiring technique can be applied to the highly polymerized transparent film 21 to minimize the wiring pattern size within the purview of the invention.

Figure 4:
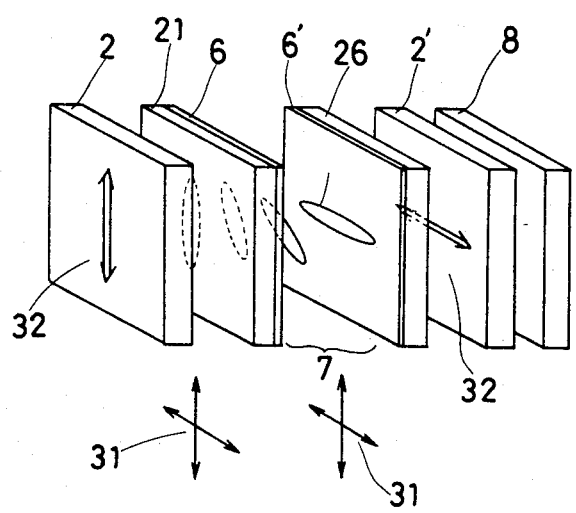
FIG. 4 shows an exploded perspective view of the optical display panel of the present invention.

In the foregoing embodiments, the highly polymerized compound film 21 is used for the front substrate of the liquid crystal display panel. Accordingly, there is a possibility that an interference color pattern is observed due to the cooperation of the sandwiching polarizers and the film. Of course, the interference is not observed in the dynamic scattering mode liquid crystal display, wherein the polarizers are not employed, FIG. 4 shows a preferred arrangement to minimize the occurrence of interference color patterns. When the film substrate 21 is rounded between the polarizers 2 and 2', there are four directions 31 at which little interference is observed. If the direction 31 is parallel with the polarizing direction of the polarizers, the interference color pattern is never observed.

The invention being thus described, it will be obvious that the same may be varied in many ways. Such variations are not to be regarded as a departure from the spirit and scope of the invention, and all such modifications are intended to be included within the scope of the invention as defined by the following claims.

What is claimed is:

1. A liquid crystal display cell comprising:
   a flexible transparent highly polymerized compound film including a first section defining a first substrate for a liquid crystal display cell, and a second section extending from said first section;
   first electrodes formed on said flexible transparent film in said first section, said first electrodes functioning as drive electrodes for said liquid crystal display cell;
wiring patterns formed on said flexible transparent film in said second section, said wiring patterns being electrically connected to said first electrodes;
a transparent counter substrate confronting said first section of said transparent film;
second electrodes formed on said transparent counter substrate, said second electrodes functioning as drive electrodes for said liquid crystal display cell in combination with said first electrodes;
liquid crystal compositions disposed between said flexible transparent film and said transparent counter substrate;
sealing means for sealing said liquid crystal compositions within said first section; and
at least one semiconductor circuit element mounted on said second section of said flexible transparent film and electrically connected to said wiring patterns;
wherein said first and second sections of said transparent film are positioned in different planes.

2. The liquid crystal display device of claim 1, wherein said planes are parallel to each other.

3. The liquid crystal display device of claim 2, wherein said wiring patterns are formed on and said at least one semiconductor element is positioned on a surface of said second section which faces said first section.

4. A liquid crystal display cell comprising:
a flexible transparent highly polymerized compound film including a first section defining a first substrate for a liquid crystal display cell, and a second section extending from said first section;
first electrodes formed on said flexible transparent film in said first section, said first electrodes functioning as drive electrodes for said liquid crystal display cell;
wiring patterns formed on said flexible transparent film in said second section, said wiring patterns being electrically connected to said first electrodes;
a transparent counter substrate confronting said first section of said transparent film and comprising a portion of said flexible transparent film;
second electrodes formed on said transparent counter substrate, said second electrodes functioning as drive electrodes for said liquid crystal display cell in combination with said first electrodes;
liquid crystal compositions disposed between said flexible transparent film and said transparent counter substrate;
sealing means for sealing said liquid crystal compositions within said first section; and
at least one semiconductor circuit element mounted on said second section of said flexible transparent film and electrically connected to said wiring patterns.

* * * * *